United States Patent [19]

Woodruff

[11] 4,365,512

[45] Dec. 28, 1982

[54] NULL CIRCUIT FOR USE IN AN ANGULAR RATE INSTRUMENT

[75] Inventor: James R. Woodruff, Concord, Calif.

[73] Assignee: Systron-Donner Corporation, Concord, Calif.

[21] Appl. No.: 216,194

[22] Filed: Dec. 15, 1980

Related U.S. Application Data

[63] Continuation-in-part of Ser. No. 90,108, Nov. 1, 1979, abandoned.

[51] Int. Cl.³ .............................................. G01P 7/00
[52] U.S. Cl. .................................... 73/503; 73/517 A
[58] Field of Search ............ 73/503, 516 R, 516 LM, 73/517 R, 517 A

[56] References Cited

U.S. PATENT DOCUMENTS 3,948,107  4/1976  Asmar et al. ........................ 73/503
4,085,363  4/1978  Gravina et al. ..................... 73/503

Primary Examiner—James J. Gill
Attorney, Agent, or Firm—Flehr, Hohbach, Test, Albritton & Herbert

[57] ABSTRACT

An angular rate instrument adapted for mounting to a given object for measuring the rate of turn of the latter is disclosed herein. This instrument utilizes an angular accelerometer to sense angular acceleration to which the instrument is subjected and a circuit for integrating the difference between this signal and a reference signal to produce an integrated output signal corresponding to the rate of turn of the object. The angular rate instrument also utilizes a null circuit for producing the reference signal in response to and dependent on low frequency error signals which appear at the output of the signal integrating circuit. The null circuit uses a capacitor to provide the reference signal and means for maintaining the charge on the capacitor during power interruptions so as to prevent losing the reference signal as a result of such interruptions.

12 Claims, 3 Drawing Figures

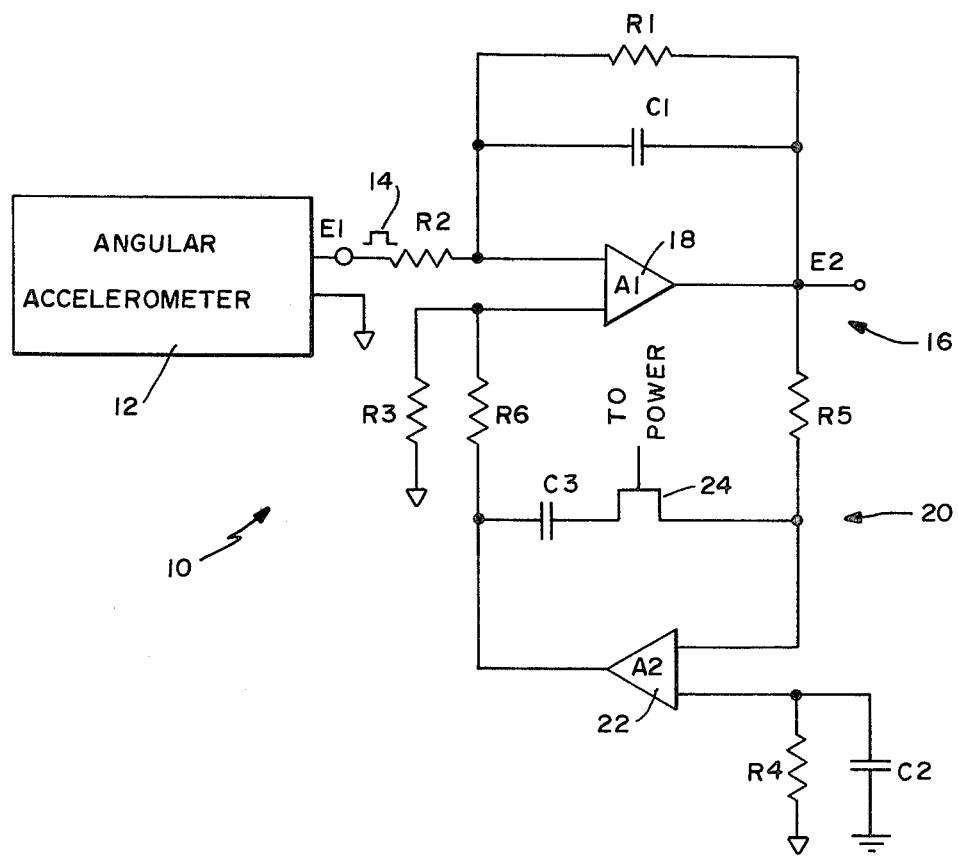
FIG.—1

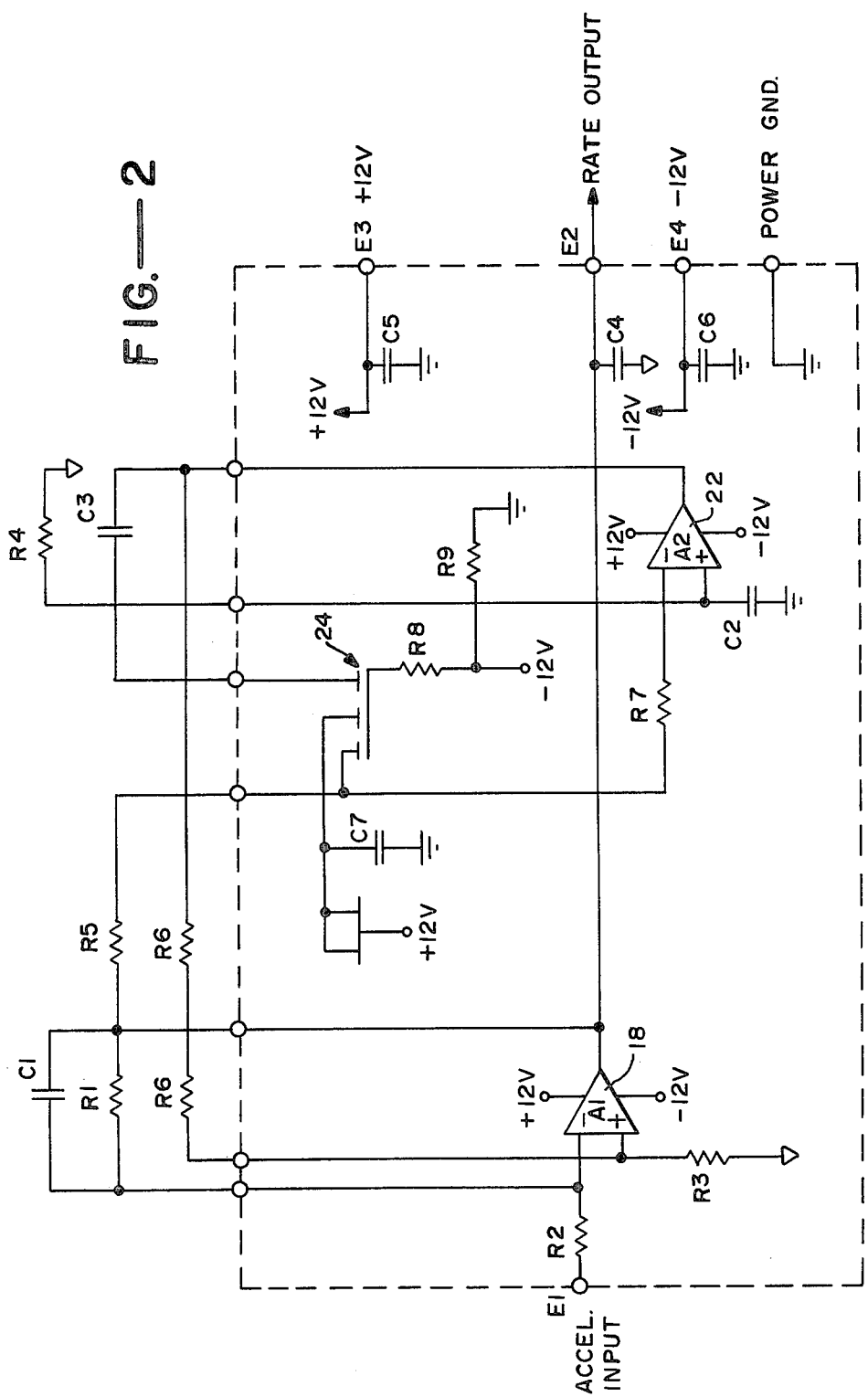
FIG.—2

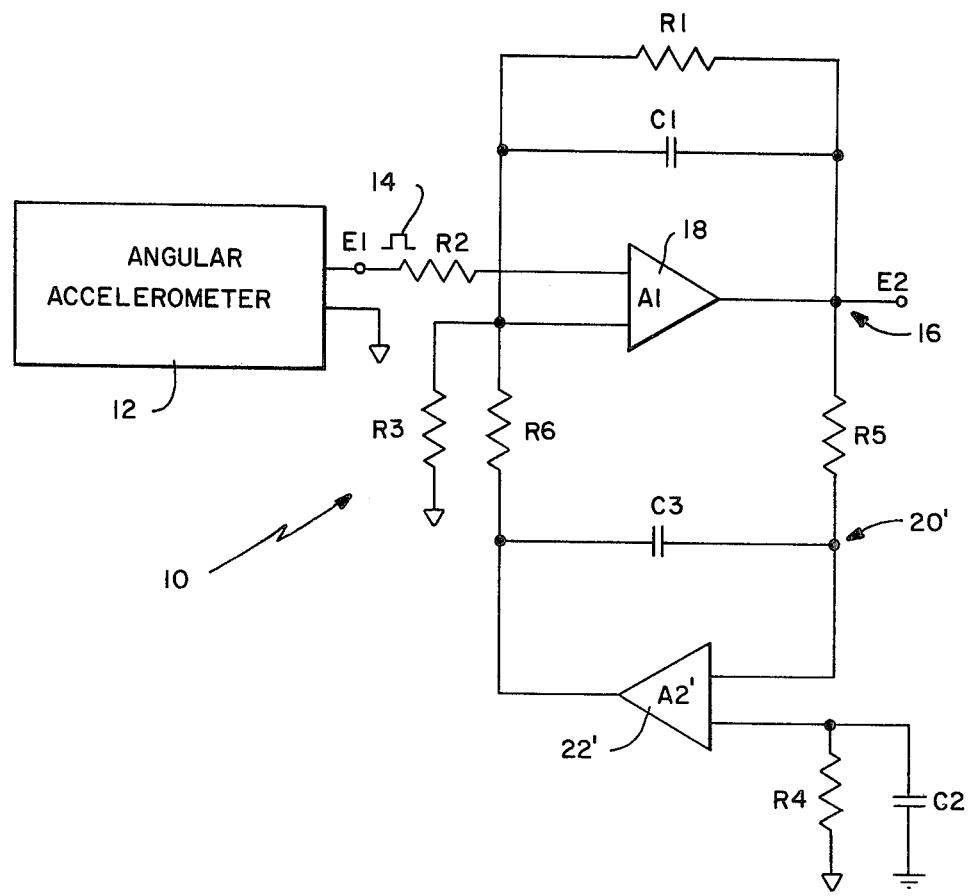
FIG.—3

NULL CIRCUIT FOR USE IN AN ANGULAR RATE INSTRUMENT

The present application is a continuation-in-part of U.S. patent application Ser. No. 90,108, filed Nov. 1, 1979, now abandoned.

The present invention relates generally to angular rate instruments or the like which utilize null circuits for reducing the effect of internal error signals by providing corresponding null signals and more particularly to an angular rate instrument including a null circuit capable of retaining its null signal during interruptions of power to the instrument.

One way to measure the rate of turn of a given object, for example an airplane, is to utilize a typical angular rate instrument presently in commercial use. This instrument includes an angular accelerometer which produces an output signal responsive to and dependent on the angular acceleration to which the instrument is subjected when, for example, the object goes into a turn. This output signal is compared to a reference signal by suitable circuit means and the difference between the two is integrated to produce an integrated output signal corresponding to the rate of turn of the object.

From the foregoing, it should be apparent that internal errors appearing at the output of the angular accelerometer and possible errors within the integrating circuitry will change the differential signal being integrated and therefore the integrated signal itself. In order to compensate for these error signals, which are typically low frequency signals (usually DC noise) on the order of for example 1 mv, the angular rate instrument utilizes a null circuit including an operational amplifier and capacitor for producing the previously referred to reference signal. This circuit operates in response to the low frequency error signals at the output of the signal integrating circuit, that is, signals characterized by a frequency below a predetermined frequency, to charge its capacitor in proportion to the magnitude of these signals. The charge on the capacitor, in turn, provides the reference signal, depending upon the magnitude of the charge.

One already recognized drawback in the null circuit just described resides in the way in which it responds to power interruptions. As stated above, during normal operation the reference signal produced by the null circuit is dependent on the charge on its capacitor. However, it has been found that when the null circuit is subjected to a momentary power interruption, the capacitor loses its charge and therefore its reference signal so that, when power is restored, the signal integrating circuit is not properly nulled and, hence, integrates the error signal until the capacitor recharges to its pre-interruption level. During this interim period, the integrating circuit acts on the inaccurate ("out-of-null") differential signal, resulting in an output signal which does not accurately reflect rate of turn. Heretofore, there have been no successful techniques proposed to avoid this capacitor discharge problem during momentary power interruptions. However, as will be seen hereinafter, the present invention solves this problem in a reliable and yet uncomplicated and economical way.

In view of the foregoing, one object of the present invention is to provide an accurate angular rate instrument which retains its accuracy by remaining free of DC error even immediately following momentary power interruptions during its operation.

A more particular object of the invention is to provide the accuracy just mentioned by means of a null circuit which utilizes a capacitor to provide a null signal to null the angular rate instrument, and specifically an uncomplicated, reliable and yet economical circuit which retains its null signal during momentary power interruptions.

With the exception of its null circuit, the angular rate instrument disclosed herein may be identical with the one described previously, that is, it may include the previously described angular accelerometer and signal integrating circuit means. Moreover, the null circuit itself may be identical to the extent that it includes the previous capacitor. However, in accordance with the present invention, the null circuit disclosed herein includes means for preventing the capacitor from losing its charge during interruptions of power. In one embodiment, as will also be seen hereinafter, this last named means includes a switch operating between a closed circuit position during the presence of power and an open circuit position in response to and during power interruption. The switch is connected in circuit with the capacitor so as to prevent the latter from discharging when the switch is in its open circuit position. In a second embodiment, the discharge preventing means includes an existing circuit component, that is, one which aids in providing the previously mentioned reference signal. In order to accomplish this, the existing component must be selected to have a relatively high impedance during the absence of power thereto.

The overall angular rate instrument will be described in more detail hereinafter in connection with the drawing, wherein:

FIG. 1 is a schematic illustration of an angular rate instrument including a null circuit designed in accordance with one embodiment of the present invention;

FIG. 2 is a more detailed schematic illustration of the instrument illustrated in FIG. 1;

FIG. 3 is a schematic illustration of an angular rate instrument including a null circuit designed in accordance with a second embodiment of the present invention.

Turning now to the drawings, attention is first directed to FIG. 1 which illustrates an angular rate instrument 10 designed in accordance with the present invention. This instrument is adapted for mounting to a given object, e.g., an airplane, for measuring the rate of turn of the latter and includes an angular accelerometer 12 of conventional design. Angular accelerometer 12 is provided for producing at its output E1 a signal 14 responsive to and dependent on the angular acceleration to which the angular accelerometer is subjected, which in turn, depends upon the angular acceleration of the airplane or other object to which it is mounted.

Angular rate instrument 10 also includes an integrating type of operational amplifier circuit 16 including the amplifier itself indicated at 18, resistor R1 and capacitor C1, each of which is connected across the amplifier. Amplifier 18 includes two inputs, a first "active" input which is connected to the output E1 of angular accelerometer 12 through an input resistor R2, and a second "reference" input. The reference input is connected to ground through a grounding resistor R3 and also to the output of a null circuit (to be discussed hereinafter) for receiving a reference signal produced by the null circuit. From an operational standpoint circuit 16 is responsive to signal 14 at its active input and the reference signal at its reference input for integrating the difference between these two signals to produce at its output E2 an integrated output signal corresponding to the rate of turn to which the overall angular instrument is subjected. Circuit 16, like angular accelerometer 12 may be of conventional design.

In addition to angular accelerometer 12 and integrating circuit 16, the overall angular rate instrument 10 includes a null circuit 20 which is responsible for providing the previously mentioned reference signal which changes to take into account the presence of any low frequency error signals present at the output of angular accelerometer 12 or within circuit 16, as will be discussed hereinafter. Null circuit 20 includes an operational amplifier 22 including one input connected to ground through a resistor R4 and a filter capacitor C2 and a second input connected to the output E2 of circuit 16 through a resistor R5.

Nulling circuit 20 includes amplifier 22 with its output connected to the reference input of operational amplifier 18 through resistor R6, and also includes capacitor C3 connected between the output and the input of amplifier 22. The ratio of the output signal of circuit 20 relative to its input signal is inversely proportional to the frequency of the input signal so that low frequency signals, e.g., DC error signals, are passed more readily and higher frequency signals, e.g., rate of turn signals, are attenuated. Resistor R5 and capacitor C3 are selected, with the components of the integrating circuit 16, so that the nulled integrating circuit consisting of integrating circuit 16 and null circuit 20 will pass, from its input E1 to its output E2, signals above a predetermined frequency, e.g., the rate of turn signals, but will not pass signals below this predetermined frequency, such as DC noise signals.

In actual operation, the predetermined frequency just mentioned is selected to be substantially below that of the expected or typical higher frequency output signals at output E2 which accurately reflect rate of turn. These latter high frequency signals with which there may or may not be the low frequency error signals (including DC signals) do not themselves reach the output of the null circuit because of their high frequency. On the other hand, if signal 14 from angular accelerometer 12 includes a low frequency or DC error signal or if such a signal exists in the internal circuitry of amplifier 18, this signal will be integrated by circuit 16 and appear as a low frequency component of the output signal appearing at output E2 and will be passed by operational amplifier 22 to its output. It should be apparent in FIG. 1 that the capacitor C3 will charge in proportion to the magnitude of these low frequency signals at the output of amplifier 22 and the magnitude of the reference signal applied to the reference input of amplifier 18 will depend directly on the magnitude of the charge on capacitor C3. Typically the error signal is on the order of about one mvDC.

The null circuit 20 to the extent thus far described may be as shown in U.S. Pat. No. 3,948,107. The cut-off frequency resulting from the long time constant characterized by resistor R5 and capacitor C3 is approximately 0.006 Hz.

While not illustrated in FIG. 1, it should be apparent that all of the circuitry comprising overall angular instrument 10 operates from electrical power which is preferably from a single source, which in a typical application consists of a source of plus and minus 12 volts DC. During normal operation of instrument 10, that is, so long as there are no power interruptions, angular accelerometer 12 produces an output signal 14 at E1 corresponding to the angular acceleration discussed previously. The signal which may or may not include a low frequency error component is applied to the active input of amplifier 18 for comparison with the reference signal at its reference input. The difference between these signals is integrated to provide the rate of turn signal at output E2. This rate of turn signal may or may not include a low frequency error component. If such a component is present, it will be passed by amplifier 22 to charge capacitor C3 and comprises part of or is the entire reference signal at the output of null circuit 20. In this way, all low frequency error signals, that is, signals below the previously described predetermined frequency, are nulled out of circuit 16.

Should there be an interruption of power during normal operation of instrument 10, that is, after capacitor C3 is charged to its reference level, the latter will discharge and circuit 20 will lose its null until the capacitor is again charged to its pre-interruption level, unless of course, this is prevented. In accordance with the present invention, null circuit 20 includes a switch 24 which, as illustrated in FIG. 1, is connected in series with capacitor C3. In FIG. 1, it is shown between the capacitor C3 and the input of amplifier 22. This switch may be connected in any suitable way with the power to instrument 10 so as to operate between a closed circuit position when the power is on and an open circuit position when the power is off. In a preferred embodiment, the switch is an enhancement mode MOS/FET which will be discussed in more detail with respect to FIG. 2 along with the way in which it is connected with the incoming power. In any event, so long as the power remains on, switch 24 remains conductive so that it does not interfere with the operation of capacitor C3 and, in fact, the entire overall circuit. However, should instrument 10 lose power, switch 24 automatically opens, thereby preventing capacitor C3 from discharging. In this way, when the power returns, the charge on capacitor C3 remains unchanged so that its magnitude is the same as it was just prior to interruption of power, which means that the reference null is also the same. Therefore, integrating circuit 16 is properly nulled immediately after an interruption of power as it was before.

Referring now to FIG. 2, signal integrating circuit 16 and null circuit 20 comprising an actual working embodiment of angular rate instrument 10 are shown in detail. The angular accelerometer is not shown, although its output E1 is illustrated. All of the components illustrated and discussed with respect to FIG. 1 are shown in FIG. 2 along with a number of other components. These other components include a filter capacitor C4 between the output E2 and the ground. Two other filter capacitors C5 and C6 are respectively connected to power input terminals E3 and E4 which are supplied with ± DC power from a supply (not shown), the terminals being connected to the various components making up instrument 10. Still other components of the two circuits shown in FIG. 2 and not illustrated in FIG. 1 include the circuitry associated with switch 24 which will be discussed hereinafter, the plus and minus power inputs to the two amplifiers 18 and 22 and an input resistor R7 at one input of amplifier 22. The previously described resistor R6 is shown in FIG. 2 separated into two individual resistors.

Referring specifically to switch 24, it can be seen that this switch is a MOS/FET which has a correction to its substrate. The switch is connected through a grounding resistor R8 to the −12 volt power supply. A second grounding resistor R9 is provided between the power supply and ground. This −12 volt supply when present maintains the switch in its conductive closed position. While the substrate may be left unconnected, it is preferable to maintain it at a positive voltage. In the embodiment shown, the substrate is maintained at +12 volts DC through a JFET which is connected to act as a diode. As long as the 12 volt source is present, the substrate will be maintained at this voltage level. At the same time, the charging capacitor C7 is connected in circuit between ground on one side and a point between the JFET diode and the substrate of switch 24. This capacitor charges to the +12 volt DC applied to the substrate during the presence of the 12 volt supply. During an interruption of power, this capacitor maintains the substrate at +12 volts. During this time the JFET diode is reversed biased and non-conducting so as to prevent discharge of capacitor C7.

It is to be understood that the embodiment just described in FIG. 2 is provided for illustrative purposes only. This specific example is not intended to limit the present invention as described in respect to FIG. 1.

Referring now to FIG. 3, attention is directed to a second null circuit 20' designed in accordance with the present invention. With two exceptions to be discussed below, circuit 20' may be identical to previously described circuit 20 and may comprise part of overall instrument 10 in place of circuit 20. As a result, FIG. 3 is identical to FIG. 1, except that null circuit 20' is shown instead of circuit 20.

The only differences between the circuits 20 and 20' illustrated reside in the elimination of previously described switch 24 and the use of a modified operational amplifier 22'. This latter component aides in providing the necessary reference signal at the reference input to integrating amplifier 18 during normal operational instrumentation and, in this regard, functions in the same way as previously described operational amplifier 22. However, amplifier 22' is also intended to serve the same function as switch 24 during power interactions, that is, as a means for preventing the capacitor C3 from discharging, thereby eliminating the need for switch 24. In order for amplifier 22' to function in this way, it must display a sufficiently high impedance in the absence of power thereto for providing, in effect, an open circuit or substantially an open circuit during power interruptions. One such device which also functions in the desired manner during "power-on" periods is a MOSFET input operational amplifier, for example one sold by RCA by the number CA3240AE.

What is claimed is:

1. An angular rate instrument adapted for mounting to a given object for measuring the rate of turn of the latter, comprising: means for producing a first signal responsive to and dependent on the angular acceleration to which said instrument is subjected; means responsive to said first signal at one input and a reference signal at a second input for integrating the difference between the two latter signals to produce an integrated output signal corresponding to the rate of turn to which said instrument is subjected; and means including a capacitor connected to the second input of said signal integrating means for producing said reference signal such that the magnitude of the latter is dependent on the magnitude of charge on said capacitor, said last named means also being connected with the output of said integrating means and including means responsive to signals at said output below a predetermined frequency for charging said capacitor to a magnitude depending on said last mentioned signals, and means for preventing said capacitor from losing its charge during interruptions of power to said instrument.

2. An instrument according to claim 1 wherein said preventing means includes switch means operating between a closed circuit position during presence of said power and an open circuit position in response to and during said power interruption, said switch means being connected in circuit with said capacitor for preventing the latter from discharging when in said open circuit position without interferring with said reference signal.

3. An instrument according to claim 1 wherein said capacitor including means includes circuit component means aiding in the production of said reference signal during normal operation of said instrument, said circuit component means cooperating with said capacitor and displaying a sufficiently high impedance during the absence of power thereto so as to serve as said means for preventing said capacitor from losing its charge during interruption of power to said instrument.

4. An instrument according to claim 3 wherein said circuit component means includes a MOS/FET input operational amplifier.

5. A null circuit for use in an angular rate instrument including an angular accelerometer which produces a first signal responsive to and dependent on the angular acceleration to which said accelerometer is subjected, and circuit means responsive to said first signal at one input and a reference signal at a second input for integrating the difference between the two latter signals to produce an integrated output signal corresponding to the rate of turn to which said accelerometer is subjected, said null circuit being connected to the second input of said signal integrating circuit means and including a capacitor for producing said reference signal such that the magnitude of the latter is at least in part dependent on the magnitude of charge on said capacitor, said null circuit also being connected with the output of said signal integrating circuit means and including means responsive to integrated signals at said output, said last mentioned means being more responsive to low frequency integrated signals than to higher frequency signals for charging said capacitor to a magnitude depending on said low frequency signals, said null circuit also including means for preventing said capacitor from losing its charge during interruptions of power to said instrument.

6. A null circuit according to claim 5 wherein said last named means includes switch means operating between a closed circuit position during presence of said power and an open circuit position in response to and during said power interruption, said switch means being connected in circuit with said capacitor for preventing the latter from discharging when in said open circuit position without interferring with said reference signal.

7. A null circuit according to claim 6 wherein said switching means includes a MOS/FET carried on its own substrate and means for maintaining said substrate at a fixed voltage during the presence of said power and during said interruptions, said maintaining means including a capacitor and being adapted to charge to said fixed voltage during presence of said power and connected in circuit with said substrate so as to apply its charge to said substrate during said interruptions.

8. A null circuit according to claim 5 wherein said capacitor including means includes circuit component means aiding in the production of said reference signal during normal operation of said instrument, said circuit component means cooperating with said capacitor and displaying a sufficiently high impedance during the absence of power thereto so as to serve as said means for preventing said capacitor from losing its charge during interruption of power to said instrument.

9. An angular rate instrument adapted for mounting to a given object for measuring the rate of turn of the latter, said instrument comprising: an angular accelerometer including an output and producing at said output a first signal responsive to and dependent on the angular acceleration to which said instrument is subjected; means including first and second inputs and an output, said last named means having said first input connected with the output of said angular accelerometer and responsive to said first signal and a reference signal at said second input for integrating the difference between the two latter signals to produce at its output an integrated output signal corresponding to the rate of turn to which said instrument is subjected; and a null circuit having input means connected with the output of said integrating signal producing means and an output connected with the reference input of the latter for providing said reference signal in response to and dependent on low frequency or DC error signals at the output of said signal integrating means, said null circuit including an operational amplifier and a capacitor connected on one side with the input means of said null circuit and on its opposite side with the output of said null circuit such that said capacitor charges to the magnitude of said reference signal depending upon the magnitude of said error signals, and means for preventing said capacitor from losing the charge during interruptions of the power to the latter, said last named means including switch means connected in series with said capacitor between the latter and said input means, said switch means operating between a closed position during the presence of said power so as to not interfere with operation of said capacitor and an open circuit position in response to and during said power interruptions so as to prevent said capacitor from discharging.

10. A null circuit for use in an angular rate instrument including an angular accelerometer which produces a first signal responsive to and dependent on the angular acceleration to which said accelerometer is subjected, and circuit means responsive to said first signal at one input and a reference signal at a second input for integrating the difference between the two latter signals to produce an integrated output signal corresponding to the rate of turn to which said accelerometer is subjected, said null circuit comprising circuit means connected with said signal integrating circuit means for producing said reference signal in response to and dependent on error signals which appear at the output of said signal integrating circuit means and which are characterized by a frequency below a predetermined frequency, said reference signal producing circuit means including a capacitor which is charged in proportion to the magnitude of said reference signal during operation of said null circuit and which is connected with the reference input of said signal integrating circuit means, and means for preventing said capacitor from losing its charge during interruptions of power.

11. A null circuit according to claim 10 wherein said last named means includes switch means operating between a closed circuit position during presence of said power and an open circuit position in response to and during said power interruption, said switch means being connected in circuit with said capacitor for preventing the latter from discharging when in said open circuit position without interferring with said reference signal.

12. An angular rate instrument adapted for mounting to a given object for measuring the rate of turn of the latter, said instrument comprising: an angular accelerometer including an output and producing at said output a first signal responsive to and dependent on the angular acceleration to which said instrument is subjected; means including first and second inputs and an output, said last named means having said first input connected with the output of said angular accelerometer and responsive to said first signal and a reference signal at said second input for integrating the difference between the two latter signals to produce at its output an integrated output signal corresponding to the rate of turn to which said instrument is subjected; and a null circuit having input means connected with the output of said integrating signal producing means and an output connected with the reference input of the latter for providing said reference signal in responsive to and dependent on low frequency or DC error signals at the output of said signal integrating means, said null circuit including an operational amplifier and a capacitor connected on one side with the input means of said null circuit and on its opposite side with the output of said null circuit such that said capacitor charges to the magnitude of said reference signal depending upon the magnitude of said error signals, and means for preventing said capacitor from losing the charge during interruptions of the power to the latter, said last named means including said operational amplifier, the latter cooperating with said capacitor and displaying a sufficiently high impedance during the absence of power thereto so as to serve as said preventing means.

* * * * *